United States Patent [19]

Ayzenshtok et al.

[11] Patent Number: 5,221,098
[45] Date of Patent: Jun. 22, 1993

[54] COLLET CLOSER

[75] Inventors: Gregory Ayzenshtok, Horseheads, N.Y.; Gary L. Comstock, Gillett, Pa.

[73] Assignee: Hardinge Brothers, Inc., Elmira, N.Y.

[21] Appl. No.: 787,820

[22] Filed: Nov. 5, 1991

[51] Int. Cl.⁵ .............................................. B23B 31/30
[52] U.S. Cl. ................... 279/4.07; 279/4.01; 279/4.12
[58] Field of Search ............... 279/4.01, 4.07, 4.08, 279/4.1, 4.12, 4.09

[56] References Cited

U.S. PATENT DOCUMENTS

| 3,361,433 | 1/1968 | Holdridge | 279/4.08 X |
| 3,924,514 | 12/1975 | Parsons et al. | 91/420 |
| 4,506,569 | 3/1985 | Brown et al. | 82/2 R |
| 4,690,415 | 9/1987 | Holdridge | 279/4 |
| 4,829,861 | 5/1989 | Brown et al. | 82/142 |
| 4,926,723 | 5/1990 | Lothammer | 82/118 |

Primary Examiner—Steven C. Bishop
Attorney, Agent, or Firm—Shlesinger, Arkwright & Garvey

[57] ABSTRACT

A collet closer comprises a housing including a piston and a cylinder for collet opening and closing. A tubular member supported is in said housing and has an extension projecting from the housing. The tubular support member is secured to the piston and movable therewith. The tubular member is adapted to telescopically receive and support a draw tube. The tubular support member is secured to the draw tube at the extension.

26 Claims, 3 Drawing Sheets

FIG. 1

COLLET CLOSER

FIELD OF THE INVENTION

The present invention relates generally to an apparatus for opening and closing a collet or other chucking devices.

BACKGROUND OF THE INVENTION

There are a number of devices which move a collet in order to close its jaws. These devices typically include a draw tube to axially draw the collet within a nosepiece, thus causing the collet to close upon a work piece that has been placed within it. A double acting cylinder/piston actuator is typically used, including a check valve for each of the inlets to maintain fluid pressure on the piston. The check valves are typically installed within the cylinder body, which necessarily requires complete disassembly of the device in order to repair or replace these valves.

The draw tube is also typically assembled with the device such that removal of the draw tube for cleaning, inspection, maintenance, etc. necessarily requires complete disassembly of the device, thus causing down time for the machine tool.

In the prior art collet closers, the seals frequently fail, since they also provide the function of supporting the device.

Prior art collet closers also require the hydraulic fluid to circulate through the ball bearings, thereby increasing power use and tending to raise the temperature of the device.

OBJECTS AND SUMMARY OF THE INVENTION

It is an object of the present invention to provide a collet closer wherein its check valves can be removed for inspection from the outside, without disassembling the whole apparatus.

It is another object of the present invention to provide a collet closer wherein the draw tube can be separated from the apparatus while the collet closer remains secured to the spindle of the machine tool and without requiring disassembly of the apparatus.

It is still another object of the present invention to provide a collet closer that is completely supported from the spindle assembly, thereby minimizing the weight imposed on its seals and preventing premature failure.

It is yet another object of the present invention to provide a collet closer with bearings that are greased for life, thereby eliminating the need for circulation of the hydraulic fluid through the bearings for lubrication with the resultant decrease in operating temperature and power consumption.

It is still another object of the present invention to provide a collet closer that has relatively less moving mass, thereby using less power to operate and generating less wear and tear.

It is an object of the present invention to provide a collet closer that is relatively easier to maintain.

In summary, the present invention provides a collet closer that has a relatively greater dynamic stability, less heat generation and a greater serviceability.

These and other objects of the present invention will become apparent from the following detailed description.

BRIEF DESCRIPTIONS OF THE DRAWINGS

DETAILED DESCRIPTION OF THE INVENTION

Figure 1:
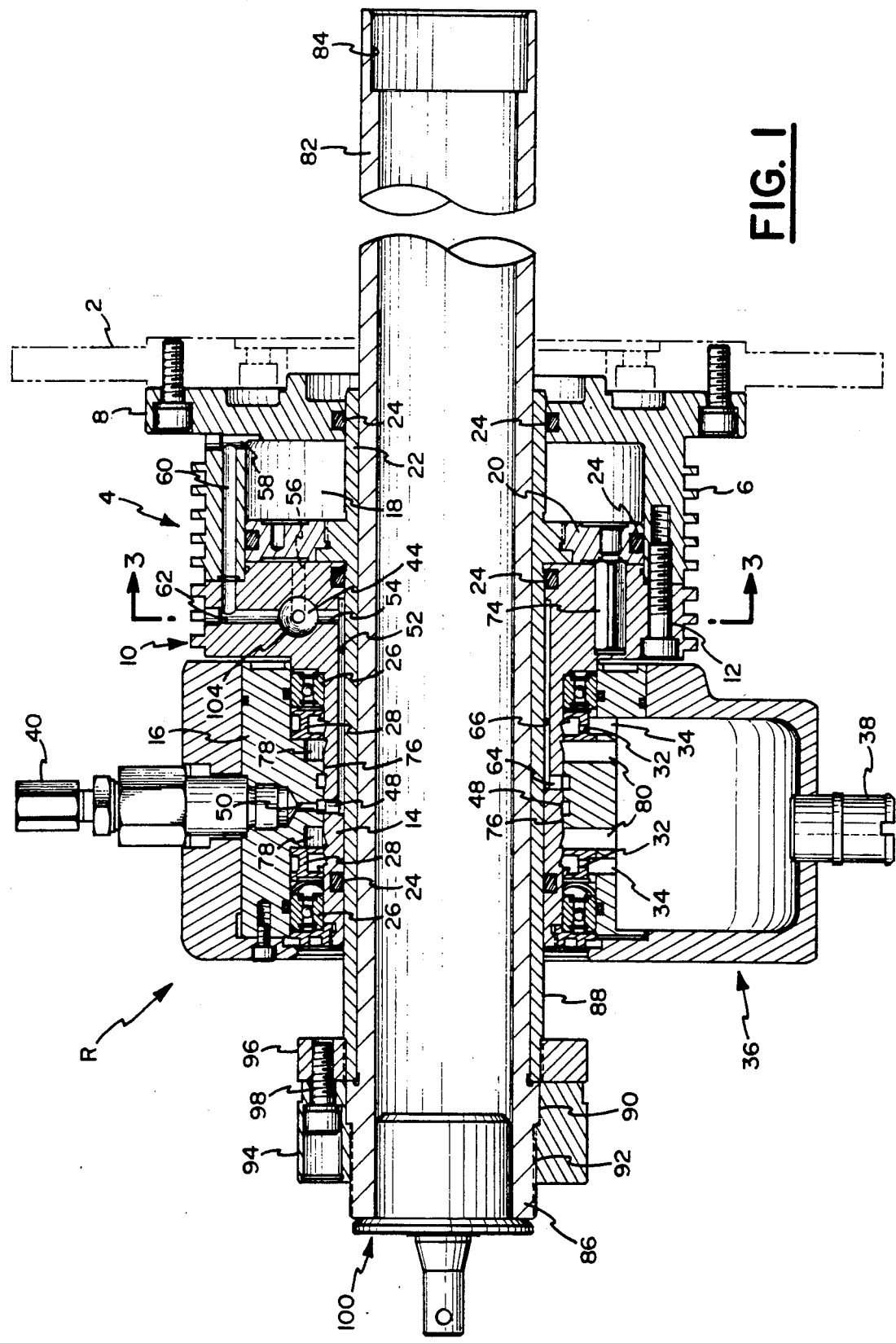
FIG. 1 is a longitudinal cross-sectional view of a collet closer assembly taken along line 1—1 in FIG. 2 in accordance with the present invention.

A collet closer assembly R in accordance with the present invention is removably secured to a spindle brake disc 2, as best shown in FIG. 1. The disc 2 is secured to a spindle assembly (not shown).

The assembly R has a cylinder housing 4 with cooling fins 6 disposed around the outside wall of the housing 4. The housing 4 has a flange portion 8 for securing to the brake disc 2. A piston cap 10 secures to the housing 4 by means of a plurality of screws 12. The piston cap 10 has a sleeve-like portion 14 that extends outwardly away from the housing 4 to provide support to a hydraulic inlet body 16, as best shown in FIG. 1.

The piston cap 10 and the cylinder housing 4 form an annular chamber 18. An annular piston 20 is disposed within the chamber 18 and threadedly secured to a tubular piston sleeve 22 that provides support to a draw tube. O-rings 24 seal the chamber 18 and the piston 20. The piston 20 is axially slidable within the chamber 18 between a collet closed position, as shown in FIG. 1, to a collet open position toward the right in the direction of the spindle assembly (not shown) and the collet (not shown).

Bearing assemblies 26 support the body 16 in rotational relationship with the piston cap portion 14. A person of ordinary skill in the art will understand that the weight of the inlet body 16, cylinder housing 4 and piston cap 10 are supported from the flange 8. Thus, the seals 24 are advantageously relieved of any load carrying functions, preventing premature failure.

Bearing seals 28 trap and drain the hydraulic fluid away from the bearing assemblies 26. Each of the bearing seals 28 has an annular groove 30 that collects any fluid seepage and drains it through an opening 32 into a drain groove 34 and thence into a drain housing 36, where it is recirculated back into the system through a connecting coupling 38, as best shown in FIG. 1.

Figure 2:
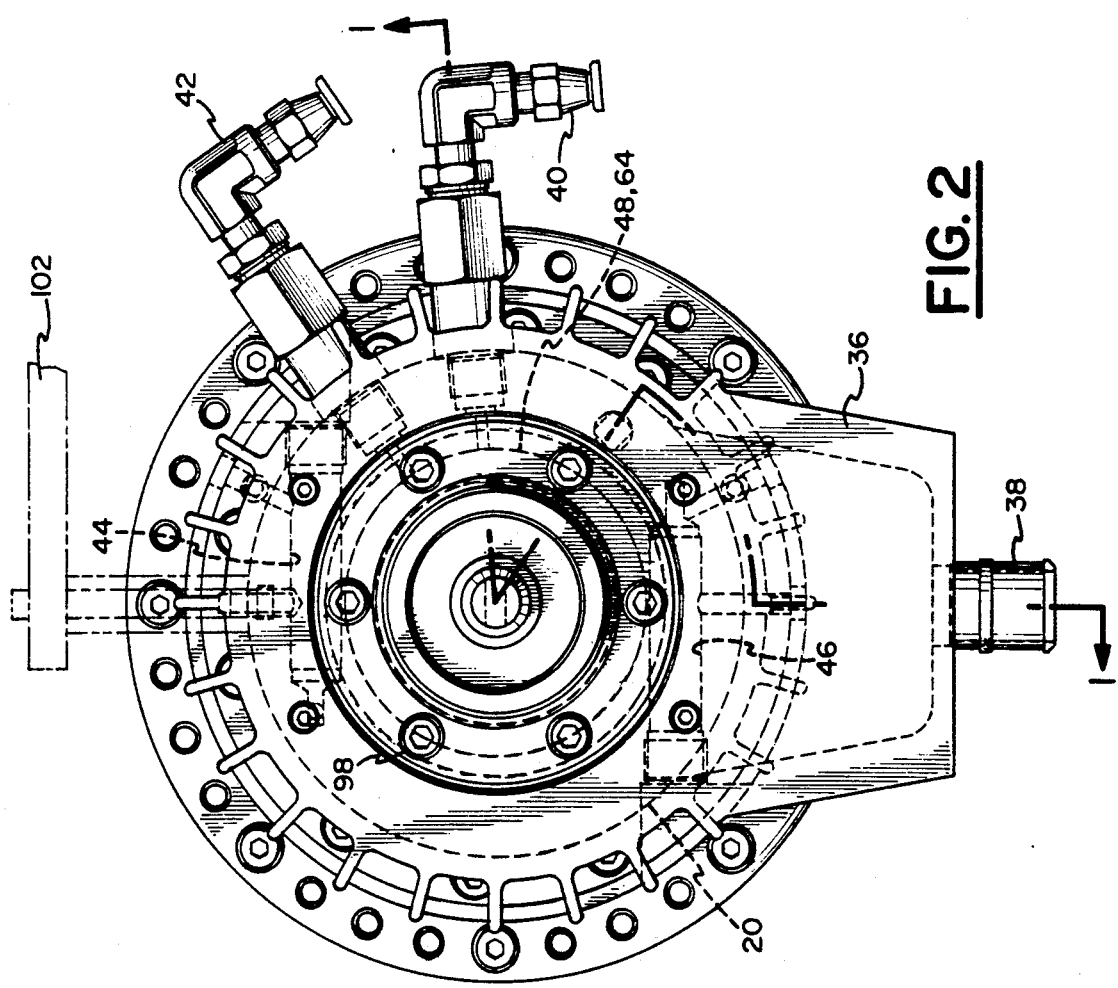
FIG. 2 is a left side elevational view of the collet closer in FIG. 1.

A collet open port 40 is disposed in the inlet body 16, as best shown in FIGS. 1 and 2. A collet close port 42 is also disposed in the body 16, as best shown in FIG. 2. A check valve 44 is associated with the port 40 and a check valve 46 with the port 42.

An annular groove 48 disposed in the piston cap portion 14 communicates with a radial passageway 50 in the inlet body 16. The passageway 50 cooperates with the port 40 for admitting hydraulic fluid into the assembly R. A longitudinal recess 52 connects with the annular groove 48 and a radial passageway 54, which in turn communicates with the check valve 44. An axial passageway 56 connects the check valve 44 with the chamber 18 on one side of the piston 20, as best shown in FIG. 1. A radial passageway 58 communicates with the chamber 18 on the other side of the piston 20 and communicates with an axial passageway 60, which communicates with a radial passageway 62, which in turn communicates with the check valve 44, as best shown in FIGS. 1 and 3.

An annular groove 64 disposed on the piston cap portion 14 communicates with the collet close port 42, as best shown in FIG. 2. A longitudinal recess 66 on the piston cap portion 14 communicates with the annular groove 64 and connects with a radial passageway 68 that communicates with the check valve 46. A radial passageway 70 communicates with the check valve 46 and connects with an axial passageway 72 into the chamber 18, as best shown in FIG. 3. An axial passageway 73 communicates with the chamber 18 on the left side of the piston 20 and communicates with check valve 46.

Figure 3:
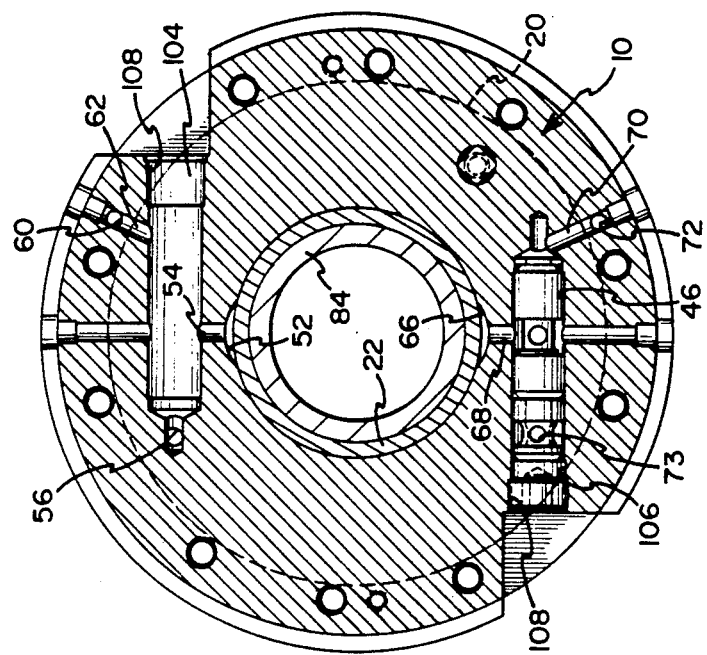
FIG. 3 is a cross-sectional view of the collet closer in FIG. 1 taken along line 3—3.

A pin 74 threadedly secured to the piston 20 is slidably received within the piston cap 10, as best shown in FIGS. 1 and 3.

A running clearance 76 between the piston cap portion 14 and the inlet body 16 communicates with the annular grooves 48 and 64 and a pair of annular drain grooves 78 in the inlet body 16, as best shown in FIG. 1. The drain grooves 78 each terminates in an opening 80 that communicates with the drain housing 36.

A draw tube 82 is slidably received within the piston sleeve 22, as best shown in FIG. 1. The draw tube 82 has one end with inner threads 84 disposed within the spindle assembly (not shown) and is secured to a collet (not shown). The other end 86 of the draw tube 82 extends beyond an extension portion 88 of the piston sleeve 22. The end 86 has a flange portion 90 that cooperates with a flange portion 92 in a ring 94. The ring 94 is threadedly secured to the end 86 of the draw tube 82. Another ring 96 is threadedly secured to the extension portion 88, as best shown in FIG. 1. The rings 94 and 96 are secured together by means of a plurality of screws 98, as best shown in FIGS. 1 and 2. A person of ordinary skill in the art will understand that removal of the screws 98 will permit one to remove the draw tube 84 from the assembly R for cleaning and inspection, without removing the assembly R from the spindle assembly or taking apart the assembly R.

A plug 100 caps the end 86 of the draw tube 84, as best shown in FIG. 1.

A vibration isolator 102 supports the inlet body 16 during operation, as best shown in FIG. 2.

The piston cap 10 has a pair of opposing recesses 104 and 106, each disposed along a chord, as best shown in FIG. 3. The check valve 44 is shown removed from the recess 104 in FIG. 3. Each of the recesses 104 and 106 provides a cavity for receiving the check valves 44 and 46, respectively. Inside threads 108 at the opening of each of the recesses 104 and 106 cooperate with corresponding threads on the check valves 44 and 46 for securing the check valves within the respective recesses 104 and 106. A person of ordinary skill in the art will understand that the check valves 44 and 46 are thus easily removable from the outside for periodic maintenance, inspection, replacement, etc., without requiring disassembly of the collet closer R.

Figure 4:
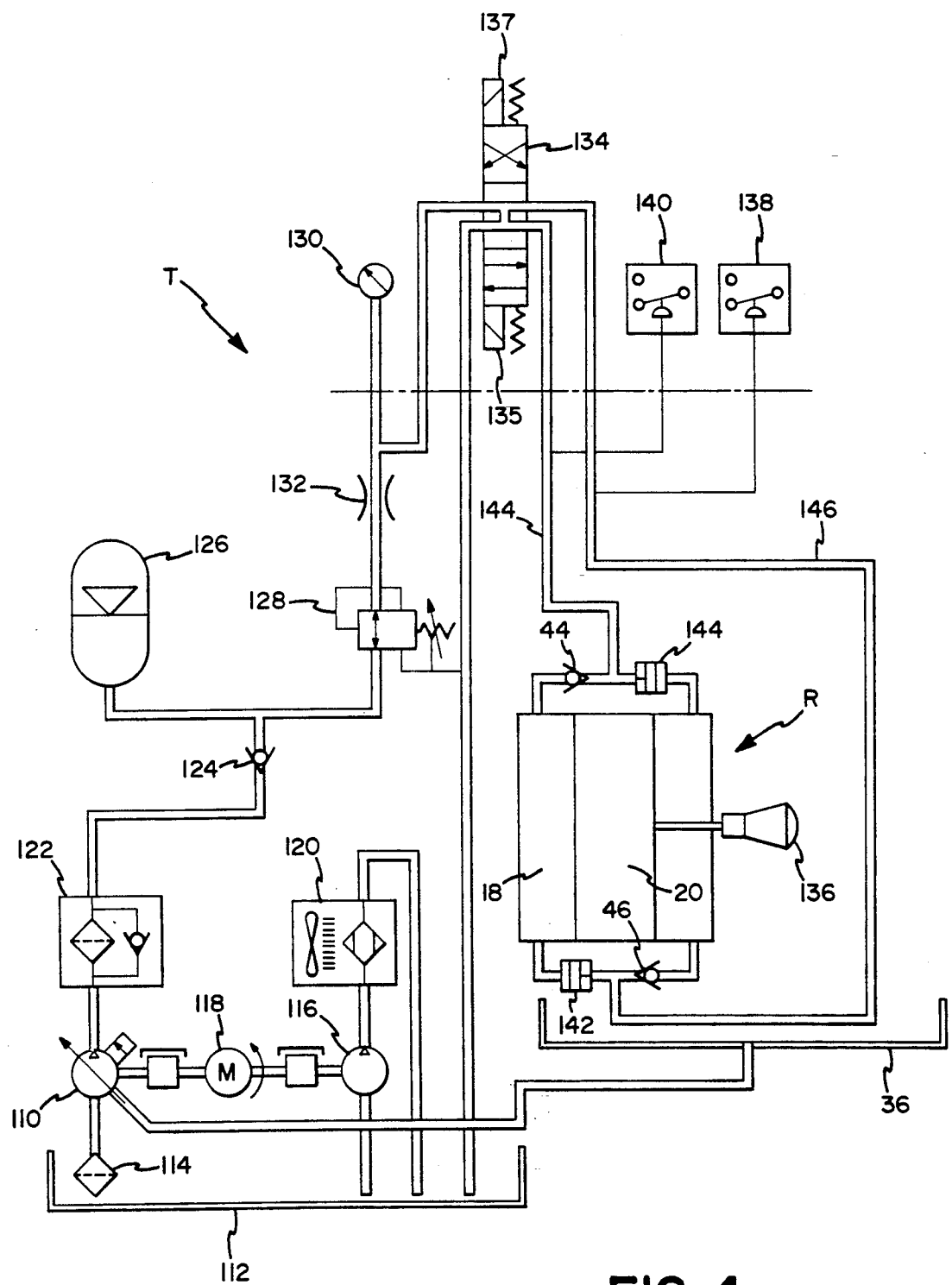
FIG. 4 is a schematic hydraulic circuit diagram for the collet closer in FIG. 1.

A schematic diagram of a hydraulic circuit T for operating the collet closer R is disclosed in FIG. 4. A pump 110 delivers pressurized hydraulic fluid to the system from a reservoir 112 through a filter 114. Another pump 116 driven by a common motor 118 circulates the hydraulic fluid in the reservoir 112 through a cooler 120. The hydraulic fluid is forced through a pressure filter 122 through a check valve 124 and to a receiver 126. The pressure filter 122 advantageously prevents possible damage to the system from over-pressure. If the pressure filter 122 senses an over-pressure, the oil is harmlessly dumped back to the reservoir 112.

A pressure regulator 128, preferably adjustable between 50 to 500 psi, maintains the pressure of the hydraulic fluid at a certain level. A pressure indicator 130 provides a read-out on the system pressure. An orifice 132 provides flow control.

A three-position four-way solenoid valve 134 directs the fluid flow to either side of the piston 20 to either close or open a collet 136. Solenoids 135 and 137 operate the valve 134. The valve 134 has a neutral position, as best shown in FIG. 4, where the hydraulic fluid flows directly to the reservoir 112 and bypasses the collet assembly R.

When the solenoid 135 is energized, the valve 134 shifts to a collet open position, and fluid is forced through the check valve 44 and into the right side of the piston 20 in the chamber 18, as best shown in FIG. 4. When the solenoid 137 is energized, the valve 134 shifts to a collet closed position and fluid pressure is introduced through the check valve 46 into the left side of the piston 20 in the chamber 18, as best shown in FIG. 4.

A pressure switch 138 provides an indication when the collet is closed. Another pressure switch 140 provides an indication when the collet 136 is open. The switches 138 and 140 activate on pressure rise, preferably 60 psi. When either of the switches 138 and 140 is activated, the valve 134 shifts to the neutral position to terminate fluid flow into the chamber 18. The check valves 44 and 46 maintain the fluid pressure within the chamber 18.

The drain housing 36 is connected to the reservoir 112 to circulate the hydraulic fluid back to the system.

OPERATION

The collet closer R is shown in the collet closed position in FIG. 1.

To open the collet, fluid under pressure is forced through the collet open port 40 by actuating the valve 134 to the appropriate position. Fluid then flows through the passageways formed by the annular groove 48, the longitudinal recess 52, and the radial passageway 54; through the check valve 44; through the axial passageway 56; and into the chamber 18 on the left side of the piston 20. The incoming hydraulic fluid into the chamber 18 then flows to the radial passageway 73 connected to the check valve 46. A pilot 142 (shown schematically in FIG. 4) associated with the check valve 46 responds to the fluid pressure and opens the check valve 46 to allow the fluid within the chamber 18 on the right side of the piston 20 to flow back to the drain housing 36 through the axial passageway 72, the radial passageway 70, through the check valve 46, through the radial passageway 48, through the longitudinal recess 66, through the annular groove 48, through the clearance 76, through the drain grooves 78, and through the openings 80 into the drain housing 36.

As fluid is admitted into the chamber 18 on the left side of the piston 20, the piston 20 moves to the right. Since the draw tube 82 is secured to the piston sleeve or draw tube support member 22, the draw tube 82 is forced to the right. The movement opens the collet to release a workpiece (not shown). The collet open switch 140 senses the pressure in line 144 and actuates the valve 134 to the neutral position when a predetermined pressure is reached as the piston 20 bottoms out, thus terminating fluid flow to the chamber 18.

To close the collet to grip a workpiece, fluid under pressure is admitted to the collet closed port 42 by actuating the valve 134 to the appropriate position. Pressurized fluid flows through the check valve 46 through the passageway formed by the annular groove 64, the recess 66, the radial passageway 68, the radial passageway 70, the axial passageway 72 and into the chamber 18 on the right side of the piston 20. The pressurized fluid actuates pilot 144 (shown schematically in FIG. 4) associated with the check valve 44 to open the check valve 44 through the passageways 58, 60 and 62. The fluid on the left side of the piston 20 is thus forced out through the check valve 44 through passageways 56, 54, 52, 48, 76, and 78 into the drain housing 36.

As the piston 20 moves to the left, the draw tube moves with it and closes the collet. When the fluid pressure builds up to a preset level, the collet closed switch 138 senses the pressure in line 146 and activates the valve 134 to the neutral position, cutting off any further fluid flow to the chamber 18. The check valves 46 maintains fluid pressure within the chamber 18.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A collet closer, comprising:
   a) a housing including a piston and a cylinder for collet opening and closing;
   b) means for securing said housing to a spindle assembly;
   c) a tubular member movably supported in said housing and having an extension projecting from said housing, said tubular member being adapted for telescopically receiving and supporting a draw tube;
   d) means for connecting said tubular support member to said piston and movable therewith; and
   e) means on said extension for securing said support member to the draw tube when the draw tube is telescopically received within said support member such that said support member is movable with the draw tube.

2. A collet closer as in claim 1, wherein:
   a) said housing includes means for receiving valve means for controlling pressurized fluid flow into said cylinder; and
   b) said receiving means is accessible from without of said housing.

3. A collet closer as in claim 2, wherein:
   a) said receiving means includes a recess disposed along a chord.

4. A collet closer as in claim 1, wherein:
   a) said tubular support member includes a flange portion; and
   b) said flange portion is secured to said piston.

5. A collet closer as in claim 1, and further comprising:
   a) seals disposed between said tubular support member and said housing.

6. A collet closer as in claim 1, wherein:
   a) said housing includes cooling fins.

7. A collet closer as in claim 1, wherein:
   a) said housing includes a sleeve portion; and
   b) a pressurized fluid inlet body rotatably supported on said sleeve portion.

8. A collet closer as in claim 7, and further comprising:
   a) bearing means disposed between said inlet body and said sleeve portion for rotatably securing said inlet body to said sleeve portion; and
   b) seal means disposed adjacent said bearing means for preventing fluid flow through said bearing means.

9. A collet closer as in claim 1, wherein:
   a) said securing means for said support member is releasable from without of said housing.

10. A collet closer as in claim 1, wherein:
    a) said extension includes an edge for abutment with a stop on the draw tube.

11. A collet closer as in claim 10, wherein:
    a) said extension includes a radial flange for cooperation with a corresponding flange on the draw tube; and
    b) means for removably securing said extension radial flange to the draw tube flange.

12. A collet closer system, comprising:
    a) a collet closer including piston cylinder means for actuating a collet to open and close;
    b) a fluid circuit means for actuating said piston cylinder means;
    c) said circuit means including valve means, having a neutral position, a collet open position and collet closed position, for selectively directing pressurized fluid to said piston cylinder means to alternately open and close the collet; and
    d) said circuit means including pressure switch means for indicating collet open and collet closed and causing said valve means to move to said neutral position when said pressure switch means senses a predetermined pressure.

13. A collet closer system, as in claim 12, wherein:
    a) said collet closer includes a housing;
    b) first and second check valve means for maintaining pressure within said cylinder piston means when said valve means in said neutral position; and
    c) said first and second check valve means are disposed in said housing and accessible from without said housing.

14. A collet closer, comprising:
    a) a cylinder for mounting to a machine tool spindle;
    b) a tubular member being mounted within said cylinder for axial movement in first and second directions relative thereto and for telescopically receiving a collet drawing member;
    c) means for securing said tubular member to the drawing member such that movement in said first direction causes the collet to close and movement in said second direction causes the collet to open;
    d) an annular piston slidably disposed within said cylinder and secured to said tubular member;
    e) first and second inlets for permitting fluid under pressure to enter said cylinder;
    f) first and second outlets for permitting fluid to exhaust from said cylinder;
    g) means for alternately directing fluid under pressure to said first and second inlets, thereby to selectively move the collet drawing member in said first and second directions to close and open the collet, respectively;
h) valve means operably associated with said first inlet and outlet and said second inlet and outlet for maintaining pressure within said cylinder after fluid flow is terminated; and
i) said valve means being accessible from without said cylinder.

15. A collet closer as in claim 14, wherein:
a) said directing means includes a four-way valve.

16. A collet closer as in claim 15, wherein:
a) said four-way valve includes a neutral position, collet open position and collet closed position.

17. A collet closer as in claim 14, wherein:
a) said valve means includes a check valve.

18. A collet closer as in claim 17, wherein:
a) said check valve is disposed in said cylinder along a chord.

19. A collet closer as in claim 14, wherein:
a) said first and second inlets each includes means for indicating when the collet is closed and opened.

20. A collet closer as in claim 19, wherein:
a) said indicating means includes a pressure switch.

21. A collet closer as in claim 14, wherein:
a) said tubular member has an exposed first end disposed away from the spindle; and
b) the collet drawing member is slidably received in said tubular member from said exposed first end.

22. A collet closer as in claim 14, wherein:
a) said cylinder includes cooling fins.

23. A collet closer, comprising:
a) a piston and a cylinder for collet closing and opening, said cylinder being secured to a spindle assembly;
b) said cylinder including a sleeve portion;
c) a fluid inlet body rotatably supported on said sleeve portion;
d) a tubular member movably supported in said cylinder, said tubular member being adapted for telescopically receiving and supporting a draw tube;
f) means for connecting said tubular support member to said piston and movable therewith; and
g) means for securing said support member to the draw tube when the draw tube is telescopically received within said tubular member such that said support member is movable with the draw tube.

24. A collet closer as in claim 23, wherein:
a) said cylinder includes cooling fins.

25. A collet closer as in claim 23, and further comprising:
a) seals disposed between said tubular member and said cylinder.

26. A collet closer as in claim 23, wherein:
a) said tubular member includes a portion extending from said cylinder; and
b) said securing means is diposed on said extending portion.

* * * * *